(12) United States Patent
Choi et al.

(10) Patent No.: US 12,501,044 B2
(45) Date of Patent: *Dec. 16, 2025

(54) IMAGE DECODING METHOD AND DEVICE USING RESIDUAL INFORMATION IN IMAGE CODING SYSTEM

(71) Applicant: LG Electronics Inc., Seoul (KR)

(72) Inventors: Jungah Choi, Seoul (KR); Jaehyun Lim, Seoul (KR); Jin Heo, Seoul (KR); Sunmi Yoo, Seoul (KR); Ling Li, Seoul (KR); Jangwon Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,834

(22) Filed: Jul. 15, 2024

(65) Prior Publication Data

US 2024/0373014 A1 Nov. 7, 2024

Related U.S. Application Data

(63) Continuation of application No. 18/140,408, filed on Apr. 27, 2023, now Pat. No. 12,058,326, which is a
(Continued)

(51) Int. Cl.
*H01L 29/94* (2006.01)
*H04N 19/124* (2014.01)
*H04N 19/129* (2014.01)
(Continued)

(52) U.S. Cl.
CPC ......... *H04N 19/124* (2014.11); *H04N 19/129* (2014.11); *H04N 19/13* (2014.11);
(Continued)

(58) Field of Classification Search
CPC .... H04N 19/124; H04N 19/129; H04N 19/13; H04N 19/132; H04N 19/176; H04N 19/18; H04N 19/70; H04N 19/91
See application file for complete search history.

(56) References Cited

U.S. PATENT DOCUMENTS

| 10,368,107 B2* | 7/2019 | Zhang | H04N 19/70 |
| 2003/0108099 A1* | 6/2003 | Nagumo | G06T 9/20 |
| | | | 375/E7.199 |

(Continued)

*Primary Examiner* — Joseph Suh
(74) *Attorney, Agent, or Firm* — Bryan Cave Leighton Paisner LLP

(57) ABSTRACT

An image decoding method, which is performed by a decoding device according to the present document, is characterized by including: a step for receiving a bitstream including residual information about the current block; a step for deriving a maximum value of the number of context-encoding bins for context syntax elements coded on the basis of context included in the residual information; a step for entropy-decoding the context syntax elements on the basis of the maximum value; a step for deriving conversion coefficients for the current block on the basis of the entropy-decoded context syntax elements; a step for deriving a residual sample for the current block on the basis of the conversion coefficients; and a step for generating a reconstructed picture on the basis of the residual sample for the current block.

3 Claims, 12 Drawing Sheets

Related U.S. Application Data continuation of application No. 17/312,602, filed as application No. PCT/KR2019/018798 on Dec. 31, 2019, now Pat. No. 11,671,598.

(60) Provisional application No. 62/787,739, filed on Jan. 2, 2019.

(51) Int. Cl.
*H04N 19/13* (2014.01)
*H04N 19/132* (2014.01)
*H04N 19/176* (2014.01)
*H04N 19/18* (2014.01)
*H04N 19/70* (2014.01)

(52) U.S. Cl.
CPC ......... *H04N 19/132* (2014.11); *H04N 19/176* (2014.11); *H04N 19/18* (2014.11); *H04N 19/70* (2014.11)

(56) References Cited

U.S. PATENT DOCUMENTS

| | | | |
|---|---|---|---|
| 2013/0003823 A1* | 1/2013 | Misra | H04N 19/174 |
| | | | 375/E7.126 |
| 2013/0251041 A1* | 9/2013 | Guo | H04N 19/91 |
| | | | 375/240.12 |
| 2016/0353113 A1* | 12/2016 | Zhang | H04N 19/91 |
| 2017/0085891 A1* | 3/2017 | Seregin | H04N 19/182 |
| 2017/0142448 A1* | 5/2017 | Karczewicz | H04N 19/91 |
| 2018/0007359 A1* | 1/2018 | Hsiang | H04N 19/91 |
| 2018/0063553 A1* | 3/2018 | Zhang | H04N 19/593 |
| 2019/0045205 A1* | 2/2019 | Henry | H04N 19/136 |
| 2019/0158837 A1* | 5/2019 | Zhang | H04N 19/187 |
| 2019/0200043 A1* | 6/2019 | Egilmez | H04N 19/172 |
| 2019/0208225 A1* | 7/2019 | Chen | H04N 19/176 |
| 2019/0238865 A1* | 8/2019 | Han | H04N 19/129 |

\* cited by examiner

IMAGE DECODING METHOD AND DEVICE USING RESIDUAL INFORMATION IN IMAGE CODING SYSTEM

This application is a Continuation of U.S. application Ser. No. 18/140,408, filed Apr. 27, 2023, which is a Continuation of U.S. application Ser. No. 17/312,602, filed Jun. 10, 2021, now U.S. Pat. No. 11,671,598, issued Jun. 6, 2023, National Stage Application of International Application No. PCT/KR2019/018798, filed Dec. 31, 2019, which claims the benefit of U.S. Provisional Application No. 62/787,739, filed Jan. 2, 2019, the contents of which are all hereby incorporated by reference herein in their entirety.

BACKGROUND OF THE DISCLOSURE

Field of the Disclosure

The present disclosure relates to an image coding technology, and more particularly, to an image decoding method and apparatus for coding residual information including syntax elements for transform coefficients of residuals in an image coding system.

Related Art

Recently, demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An aspect of the present disclosure provides a method and apparatus for increasing image coding efficiency.

Another aspect of the present disclosure provides a method and apparatus for increasing efficiency of residual coding.

Another aspect of the present disclosure provides a method and apparatus for coding residual information by adaptively adjusting a maximum number of context-coded bins for context syntax elements according to a transform block.

In an aspect, a decoding method performed by a decoding apparatus is provided. The method includes: receiving a bitstream including residual information of a current block; deriving a maximum number of context-coded bins for context-based coded context syntax elements included in the residual information; entropy decoding the context syntax elements based on the maximum number; deriving a transform coefficient for the current block based on the entropy decoded context syntax elements; deriving a residual sample for the current block based on the transform coefficient; and generating a reconstructed picture based on the residual sample for the current block.

In another aspect, a decoding apparatus performing image decoding is provided. The decoding apparatus includes: an entropy decoder receiving a bitstream including residual information of a current block, deriving a maximum number of context-coded bins for context-based coded context syntax elements included in the residual information, entropy decoding the context syntax elements based on the maximum number, and deriving a transform coefficient for the current block based on the entropy decoded context syntax elements, an inverse transformer deriving a residual sample for the current block based on the transform coefficient; and an adder generating a reconstructed picture based on the residual sample for the current block.

In another aspect, an image encoding method performed by an encoding apparatus is provided. The method includes: deriving a residual sample for a current block; deriving a transform coefficient based on the residual sample for the current block; deriving a maximum number of context-coded bins for context syntax elements for the transform coefficient; entropy encoding the context syntax elements based on the maximum number; and outputting a bitstream including residual information for the current block including the entropy encoded context syntax elements.

In another aspect, an image encoding apparatus is provided. The encoding apparatus includes: a subtractor deriving a residual sample for a current block; a transformer deriving a transform coefficient based on the residual sample for the current block; and an entropy encoder deriving a maximum number of context-coded bins for context syntax elements for the transform coefficient; entropy encoding the context syntax elements based on the maximum number; and outputting a bitstream including residual information for the current block including the entropy encoded context syntax elements.

Advantageous Effects

According to the present disclosure, overall image/video compression efficiency may be improved.

According to the present disclosure, the efficiency of residual coding may be increased.

According to the present disclosure, data coded based on context may be reduced by limiting the sum of the numbers of context-coded bins of significant coefficient flags for transform coefficients in a current block included in residual information, first transform coefficient level flags, parity level flags, and second transform coefficient level flags to a predetermined maximum number or less.

According to the present disclosure, a maximum number of the numbers of context-coded bins Of context syntax elements for transform coefficients in a current block included in residual information may be derived based on a position of a final non-zero transform coefficient, based on which the number of context-coded bins may be adaptively adjusted in consideration of the number of non-zero transform coefficients of the current block, thereby increasing overall efficiency of residual coding.

DESCRIPTION OF EXEMPLARY EMBODIMENTS

Figure 1:
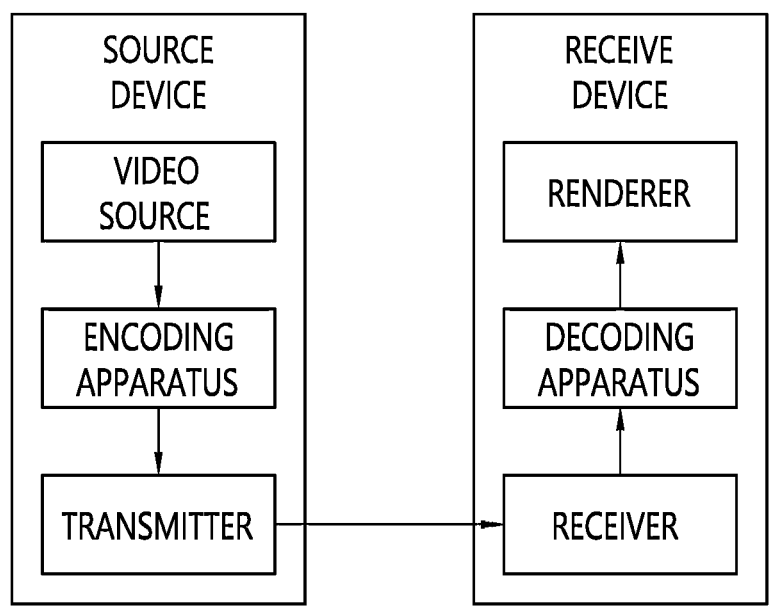
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
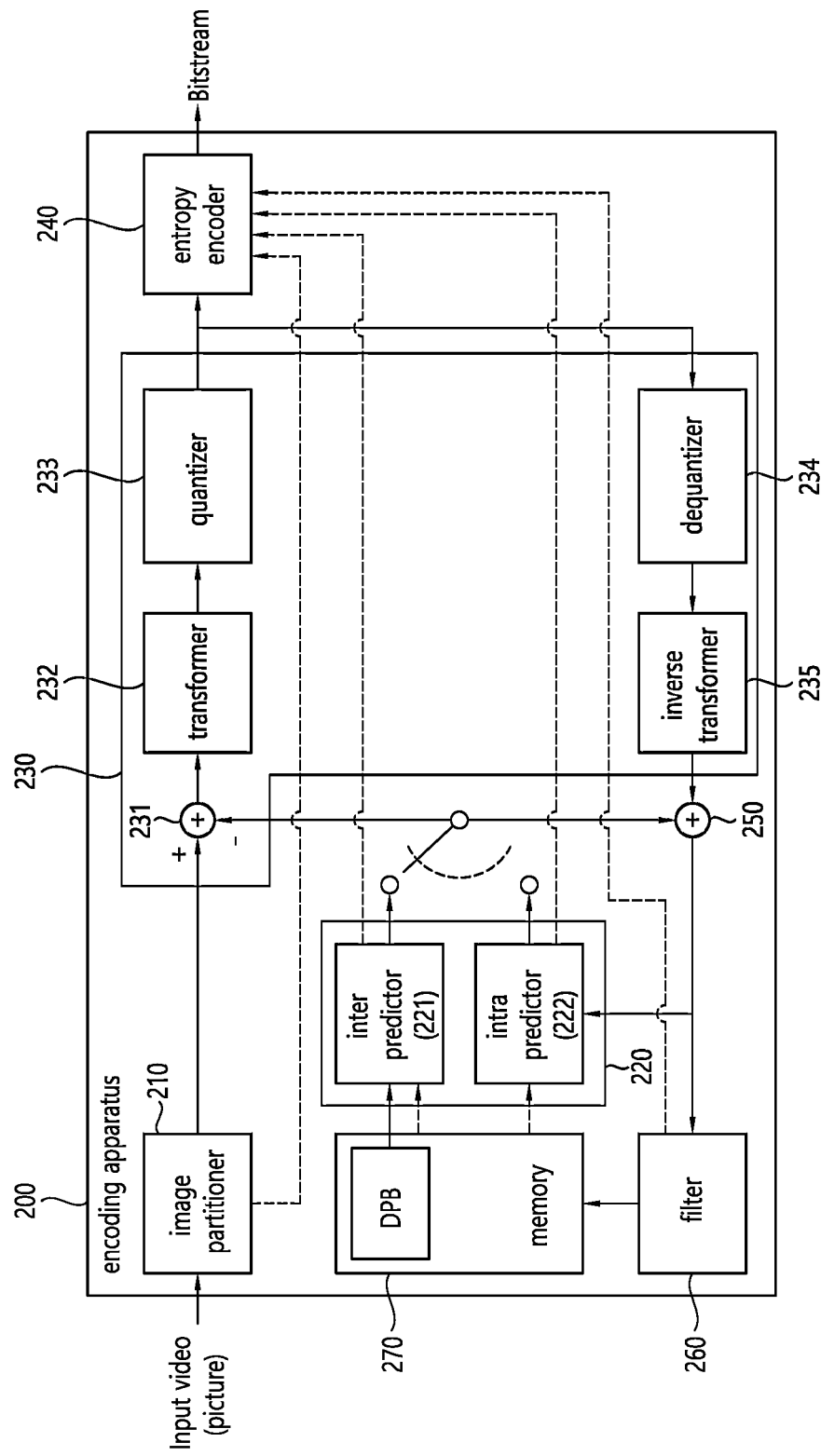
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the image encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
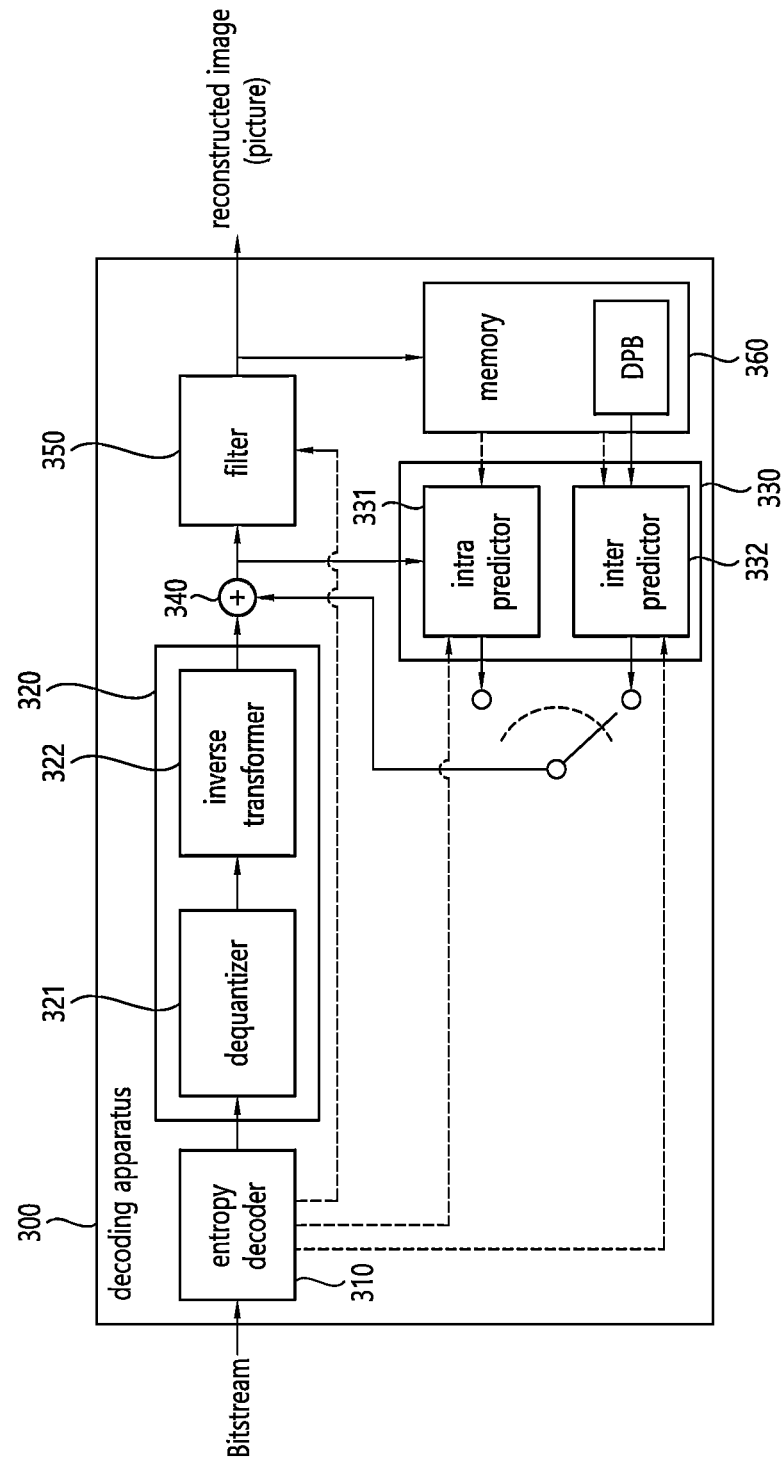
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 4:
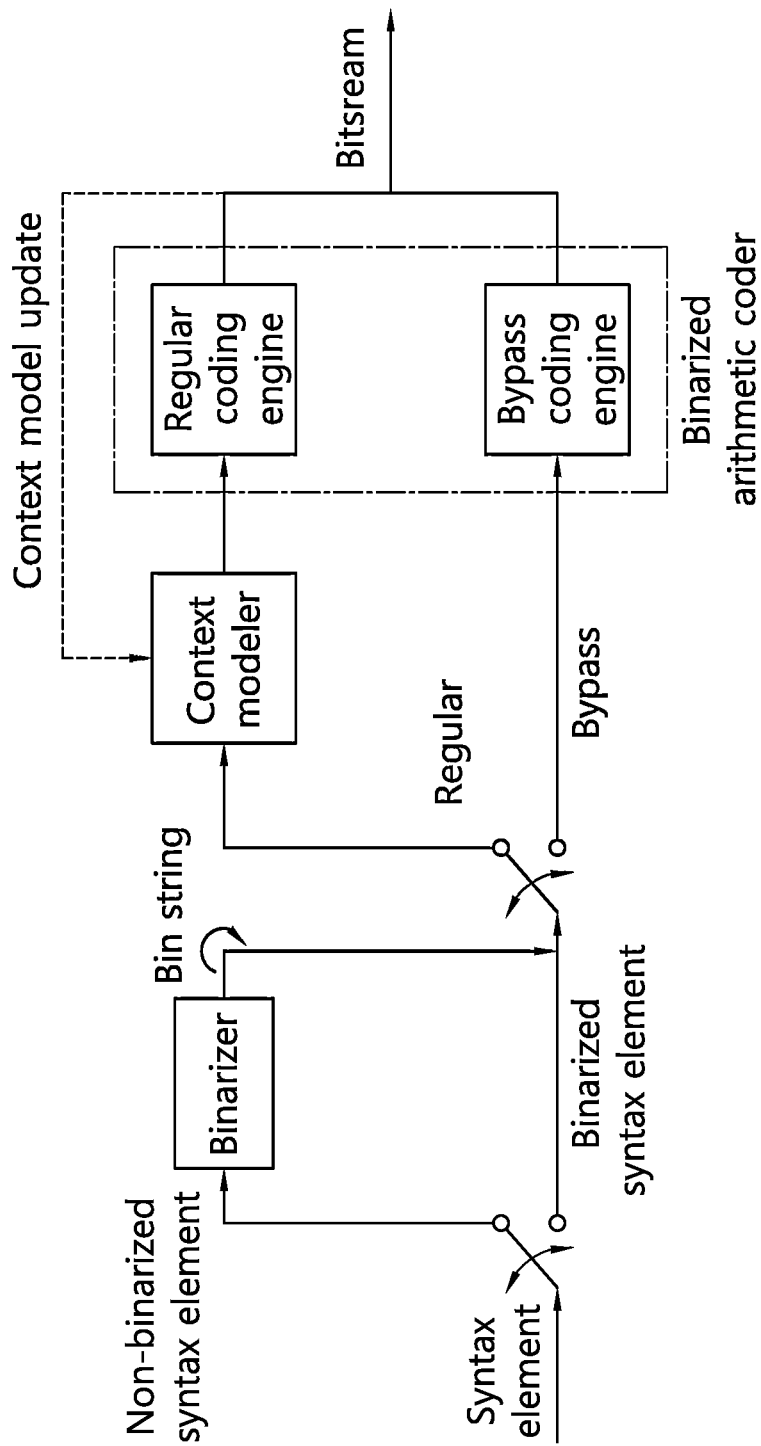
FIG. 4 exemplarily shows context-adaptive binary arithmetic coding (CABAC) for encoding a syntax element.

FIG. 4 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, the (quantized) transformation coefficients (i.e., the residual information) may be encoded and/or decoded based on syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, dec_abs_level, mts_idx. Syntax elements related to residual data encoding/decoding may be represented as shown in the following table.

TABLE 1

| | Descriptor |
|---|---|
| residual coding( x0, y0, log2TbWidth, log2TbHeight, cIdx ) { | |
|   if( transform_skip_enabled_flag && ( cIdx != 0 | | tu_mts_flag[ x0 ][ y0 ] == 0 ) && | |
|     ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix >> 3 ) | |
|     last_sig_coeff_x_suffix | ae(v) |
|   if( last_sig_coeff_y_prefix > 3 ) | |

TABLE 1-continued

|  | Descriptor |
|---|---|
| ```
        last_sig_coeff_y_suffix
log2SbSize = ( Min( log2TbWidth, log2TbHeight ) < 2 ? 1 : 2 )
numSbCoeff = 1 << ( log2SbSize << 1 )
lastScanPos = numSbCoeff
lastSubBlock = ( 1 << ( log2TbWidth + log2TbHeight − 2 * log2SbSize ) ) −1
do {
    if( lastScanPos = = 0) {
        lastScanPos = numSbCoeff
        lastSubBlock− −
    }
    lastScanPos− −
    xS = DiagScanOrder[ log2TbWidth − log2SbSize ][ log2TbHeight − log2SbSize ]
            [ lastSubBlock ][ 0 ]
    yS = DiagScanOrder[ log2TbWidth log2SbSize ][ log2TbHeight log2SbSize ]
            [ lastSubBlock ][ 1 ]
    xC = ( xS << log2SbSize ) ·
        DiagScanOrder[ log2SbSize ][ log2SbSize ][ lastScanPos ][ 0 ]
    yC = ( yS << log2SbSize ) −
        DiagScanOrder[ log2SbSize ][ log2SbSize ][ lastScanPos ][ 1 ]
} while( ( xC != LastSignificantCoeffX ) (yC != LastSignificantCoeffY ) )
numSigCoeff − 0
QState − 0
for( i = lastSubBlock; i >= 0; i− − ) {
    startQStateSb − QState
    xS = DiagScanOrder[ log2Tb Width − log2SbSize ][ log2TbHeight − log2SbSize ]
            [ lastSubBlock ][ 0 ]
    yS − DiagScanOrder[ log2TbWidth − log2SbSize ][ log2TbHeight − log2SbSize ]
            [ lastSubBlock ][ 1 ]
    inferSbDcSigCoeffFlag − 0
    if( ( i < lastSubBlock ) && ( i > 0 ) ) {
        coded_sub_block_flag[ xS ][ yS ]
        inforSbDcSigCoeffFlag − 1
    }
    firstSigScanPosSb − numSbCoeff
    lastSigScanPosSb = − 1
    remBinsPass1 − ( log2SbSize < 2 ? 6 : 28 )
    remBinsPass2 − ( log2SbSize < 2 ? 2 : 4 )
    firstPosMode0 = ( i = = lastSubBlock ? lastScanPos − 1 : numSbCoeff−1 )
    firstPosMode1 − 1
    firstPosMode2 = −1
    for( n = ( i = = firstPosMode0; n >= 0 && remBinsPass1 >= 3; n− − ) {
        xC − ( xS << log2SbSize ) − DiagScanOrder[ log2SbSize ][ log2SbSize ][ n ][ 0 ]
        yC = ( yS << log2SbSize ) − DiagScanOrder[ log2SbSize ][ log2SbSize ][ n ][ 1 ]
        if( coded_sub_block_flag[ x ][ yS ] && (n > 0 !inferSbDeSigCoeffFlag ) ) {
            sig_coeff_flag[ xC ][ yC ]
            remBinsPass1− −
            if( sig_coeff_flag[ xC ][ yC ] )
                inferSbDcSigCoeffFlag = 0
        }
        if( sig_coeff_flag[ xC ][ yC ] ) {
            numSigCoeff++
            abs_level_gt1_flag[ n ]
            remBinsPass1− −
            if( abs_level_gt1_flag[ n ] ) {
                par_level_flag[ n ]
                remBinsPass1− −
                if( remBinsPass2 > 0 ) {
                    remBinsPass2− −
                    if( remBinsPass2 − − 0)
                        firstPosMode1 − n − 1
                }
            }
            if( lastSigScanPosSb = = −1)
                lastSigScanPosSb − n
            firstSigScanPosSb = n
        }
        AbsLevelPass1[ xC ][ yC ] −
            sig coeff flag[ xC ][ yC ] + par level flag[ n ] + abs level gt1 flag[ n ]
        if( dep quant enabled flag )
            QState = QStateTransTable[ QState ][ AbsLevelPass1[ xC ][ C ] & 1 ]
        if( remBinsPass1 < 3 )
            firstPosMode2 = n − 1
    }
    if( firstPosMode1 < firstPosMode2 )
        firstPosMode1 − firstPosMode2
    for( n − numSbCoeff − 1; n > firstPosMode2; n− − )
        if( abs level gt1 flag[ n ] )
``` | ae(v)<br><br><br><br><br><br><br><br><br><br><br><br><br><br><br><br><br><br><br><br><br><br><br><br><br><br>ae(v)<br><br><br><br><br><br><br><br><br><br>ae(v)<br><br><br>ae(v)<br><br>ae(v) |

TABLE 1-continued

| | Descriptor |
|---|---|
| ```
       abs_level_gt3_flag[ n ]
    for( n = numSbCoeff − 1; n >= firstPosMode1; n− − ) {
       xC = ( xS << log2SbSize ) + DiagScanOrder[ log2SbSize ][ log2SbSize ][ n ][ 0 ]
       yC = ( yS << log2SbSize ) + DiagScanOrder[ log2SbSize ][ log2SbSize ][ n ][ 1 ]
       if( abs_level_gt3_flag[ n ] )
          abs_remainder[ n ]
       AbsLevel[ xC ][ yC ] = AbsLevelPass1[ xC ][ yC ] −
              2 * ( abs_level_gt3_flag[ n ] + abs_remainder[ n ] )
    }
    for( n = firstPosMode1; n > firstPosMode2; n− − ) {
       xC = ( xS << log2SbSize ) + DiagScanOrder[ log2SbSize ][ log2SbSize ][ n ][ 0 ]
       yC = ( yS << log2SbSize ) + DiagScanOrder[ log2SbSize ][ log2SbSize ][ n ][ 1 ]
       if( abs_level_gt1_flag[ n ] )
          abs_reminder[ n ]
       AbsLevel[ xC ][ yC ] = AbsLevelPass1[ xC ][ yC ] − 2 * abs_remainder[ n ]
    }
    for( n = firstPosMode2; n >= 0; n− − ) {
       xC = ( xS << log2SbSize ) + DiagScanOrder[ log2SbSize ][ n ][ 0 ]
       yC = ( yS << log2SbSize ) + DiagScanOrder[ log2SbSize ][ n ][ 1 ]
       dec_abs_level[ n ]
       if(AbsLevel[ xC ][ yC ] > 0 )
          firstSigScanPosSb = n
       if( dep_quant_enabled_flag )
          QState = QStateTransTable[ QState ][ AbsLevel[ xC ][ yC ] & 1 ]
    }
    if( dep_quant_enabled_flag | | !sign_data_hiding_enabled_flag )
       signHidden = 0
    else
       signHidden = ( lastSigScanPosSb − firstSigScanPosSb > 3 ? 1 : 0 )
    for( n = numSbCoeff − 1; n >= 0; n− − ) {
       xC = ( xS << log2SbSize ) + DiagScanOrder[ log2SbSize ][ log2SbSize ][ n ][ 0 ]
       yC = ( yS << log2SbSize ) + DiagScanOrder[ log2SbSize ][ log2SbSize ][ n ][ 1 ]
       if( sig_coeff_flag[ xC ][ yC ] &&
          ( !signHidden | | ( n != firstSigScanPosSb ) ) )
             coeff_sign_flag[ n ]
    }
    if( dep_quant_enabled_flag ) {
       QState = startQStateSb
       for( n = numSbCoeff − 1; n >= 0; n− − ) {
          xC = ( xS << log2SbSize ) +
              DiagScanOrder[ log2SbSize ][ log2SbSize ][ n ][ 0 ]
          yC = ( yS << log2SbSize ) +
              DiagScanOrder[ log2SbSize ][ log2SbSize ][ n ][ 1 ]
          if( sig_coeff_flag[ xC ][ yC ] )
             TransCoeffLevel[ x0 ][ y0 ][ cIdx ][ xC ][ yC ] =
                ( 2 * AbsLevel[ xC ][ yC ] − ( QState > 1 ? 1 : 0 ) ) *
                ( 1 − 2 * coeff_sign_flag[ n ] )
             QState = QStateTransTable[ QState ][ par_level_flag[ n ] ]
       } else {
          sumAbsLevel = 0
          for( n = numSbCoeff − 1; n >= 0; n− − ) {
             xC = ( xS << log2SbSize ) +
                 DiagScanOrder[ log2SbSize ][ log2SbSize ][ n ][ 0 ]
             yC = ( yS << log2SbSize ) +
                 DiagScanOrder[ log2SbSize ][ log2SbSize ][ n ][ 1 ]
             if( sig_coeff_flag[ xC ][ yC ] ) {
                TransCoeffLevel[ x0 ][ y0 ][ cIdx ][ xC ][ yC ] =
                   AbsLevel[ xC ][ yC ] * ( 1 − 2 * coeff_sign_flag[ n ] )
                if( signHidden ) {
                   sumAbsLevel += AbsLevel[ xC ][ yC ]
                   if( ( n == firstSigScanPosSb ) && ( sumAbsLevel % 2 ) == 1 ) )
                      TransCoeffLevel[ x0 ][ y0 ][ cIdx ][ xC ][ yC ] =
                         −TransCoeffLevel[ x0 ][ y0 ][ cIdx ][ xC ][ yC ]
                }
             }
          }
       }
    }
    if( tu_mts_flag[ x0 ][ 0 ] && ( cIdx == 0 ) )
       mts_idx[ x ][ y0 ][ cIdx ]
}
``` | ae(v)<br><br><br><br><br><br>ae(v)<br><br><br><br><br>ae(v)<br><br>ae(v)<br><br><br><br><br><br><br><br>ae(v)<br><br><br><br><br><br><br><br><br><br><br><br><br><br><br><br><br><br><br><br><br><br><br><br><br><br>ae(v) |

Transform_skip_flag indicates whether transform is skipped in an associated block. The transform_skip_flag may be a syntax element of a transform skip flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

In an embodiment, the encoding apparatus may encode (x,y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag [xC] [yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$remAbsLevel = |coeff| - 1 \qquad \text{[Equation 1]}$$

Here, coeff denotes an actual transform coefficient value.

In addition, abs_level_gt1_flag may indicate whether remAbsLevel' at the corresponding scanning position (n) is greater than 1. For example, when the value of abs_level_gt1_flag is 0, an absolute value of a transform coefficient of the corresponding position may be 1. In addition, when the value of the abs_level_gt1_flag is 1, the remAbsLevel indicating a level value to be coded later may be derived as shown in the following equation.

$$remAbsLevel = remAbsLevel - 1 \qquad \text{[Equation 2]}$$

In addition, the least significant coefficient (LSB) value of remAbsLevel described in Equation 2 described above may be encoded as in Equation 3 below through par_level_flag.

$$par\_level\_flag = remAbsLevel \ \& \ 1 \qquad \text{[Equation 3]}$$

Here, par_level_flag [n] may indicate parity of a transform coefficient level (value) at a scanning position n.

The transform coefficient level value remAbsLevel to be encoded after par_leve_flag encoding may be updated as shown in the following equation.

$$remAbsLevel' = remAbsLevel >> 1 \qquad \text{[Equation 4]}$$

abs_level_gt3_flag may indicate whether remAbsLevel' at the corresponding scanning position (n) is greater than 3. Encoding for abs_remainder may be performed only when rem_abs_gt3_flag is 1. A relationship between coeff, which is an actual transform coefficient value, and each syntax element may be expressed by the following equation.

$$|coeff| = \text{sig\_coeff\_flag} + \text{abs\_level\_gt1\_flag} +$$
$$\text{par\_level\_flag} + 2*(\text{abs\_level\_gt3\_flag} + \text{abs\_remainder}) \quad \text{[Equation 5]}$$

In addition, the following table shows examples related to Equation 5 described above.

TABLE 2

| |coeff| | sig_coeff_flag | abs_level_gt1_flag | par_level_flag | abs_level_gt3_flag | abs_remainder/ dec_abs_level |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 0 | 1 | |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | | |

Here, |coeff| indicates the transform coefficient level (value), and may be expressed as AbsLevel for the transform coefficient. In addition, a sign of each coefficient may be encoded using a 1-bit symbol coeff_sign_flag.

In addition, the dec_abs_level may indicate an intermediate value coded with a Golomb-Rice code at the corresponding scanning position (n). The dec_abs_level may be signaled for a scanning position that satisfies the conditions disclosed in Table 1 above. In this case, the absolute value AbsLevel (i.e., |coeff|) of the corresponding transform coefficient may be derived as one of values 0, dec_abs_level+1, dec_abs+level according to conditions.

Also, the coeff_sign_flag may indicate a sign of the transform coefficient level at the corresponding scanning position n. That is, the coeff_sign_flag may indicate the sign of the transform coefficient at the corresponding scanning position n.

Also, the mts_idx may indicate transform kernels applied in horizontal and vertical directions to residual samples in a current transform block.

Meanwhile, as shown in Table 1 above, the residual information may be encoded as shown in the following table.

TABLE 3

```
for(k... ){ // max 28 bins for 4×4 sub-block, max 6 bins for 2×2 sub-block
  sig_coeff_flag[k]
    if(sig_coeff_flag[k]){
      abs_level_gt1_flag[k]
        if(abs_level_gt1_flag[k])
          par_level_flag[k]
    }
}
for(k... ){ // max 4 bins for 4×4 sub-block, max 2 bins for 2×2 sub-block
  if(if(abs_level_gt1_flag[k])
    abs_level_gt3_flag[k]
}
for(k...){ // bypass bins
  abs_remainder[k]
}
```

TABLE 3-continued

```
for(k...){ // bypass bins
  dec_abs level[k]
...
```

Referring to Table 3, the sig_coeff_flag, the abs_level_gt1_flag, and/or the par_level_flag for transform coefficients in a subblock of a transform block may be encoded. Here, in a case in which the subblock is a 4×4 subblock, a maximum of 28 bins may be allocated to bins for the sig_coeff_flag, the abs_level_gt1_flag, and the par_level_flag, and in a case in which the subblock is a 2×2 subblock, a maximum of six bins may be allocated as bins for the sig_coeff_flag, the abs_level_gt1_flag, and the par_level_flag. Also, the bins may be context-coded bins.

Also, referring to Table 3, the abs_level_gt3_flag for transform coefficients in a subblock of a transform block may be encoded. Here, in a case in which the subblock is a 4×4 subblock, a maximum of 4 bins may be allocated as bins for the abs_level_gt3_flag. Also, in a case in which the subblock is a 2×2 subblock, a maximum of 2 bits may be allocated as bins for the abs_level_gt3_flag. Also, the bins may be context-coded bin.

In addition, referring to Table 3, the abs_remainder and/or the dec_abs_level for the transform coefficients in the subblock of the transform block may be encoded, and bins for the abs_remainder and/or the dec_abs_level may be bypass bins. That is, the abs_remainder and/or the dec_abs_level may be bypass-encoded.

Meanwhile, the present disclosure proposes an embodiment of encoding residual information differently from Table 3 described above. According to an embodiment to be described later, it is possible to improve coding performance and reduce encoding complexity and structural complexity compared to the method of encoding the residual information shown in Table 3 described above.

For example, according to the present embodiment, the residual information may be encoded as shown in the following table.

TABLE 4

```
for(k... ){ // max K bins for 4×4 sub-block, max L bins for 2×2 sub-block
  sig_coeff_flag[k]
    if(sig_coeff_flag[k]){
      abs_level_gt1_flag[k]
        if(abs_level_gt1_flag[k])
        {
```

TABLE 4-continued

```
            par_level_flag[k]
            abs_level_gt3_flag[k]
        }
    }
}
for(k...){
    abs_remainder[k]
}
for(k...){
    dec_abs_level[k]
}
...
```

Figure 5:
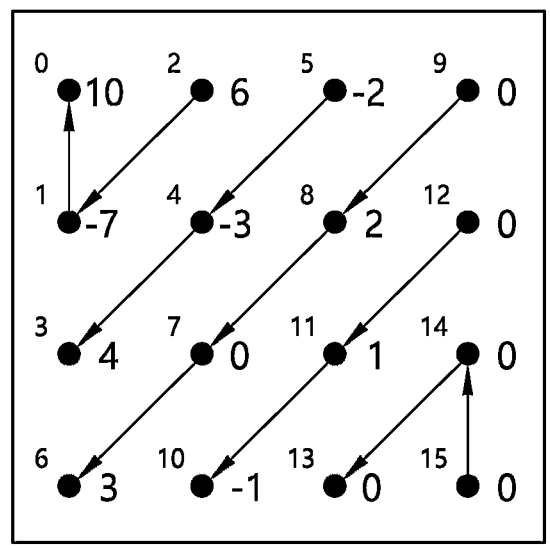
FIG. 5 is a diagram illustrating an example of transform coefficients in a 4×4 block.

The 4×4 block of FIG. 5 shows an example of quantized coefficients. The block shown in FIG. 5 may be a 4×4 transform block or a 4×4 sub-block of an 8×8, 16×16, 32×32, or 64×64 transform block. The 4×4 block of FIG. 5 may represent a luma block or a chroma block. Here, for example, residual information on transform coefficients in the block illustrated in FIG. 5 may be encoded through the embodiment described above.

As an example, when K is set to 30, encoding results for the coefficients scanned in the inverse diagonal of FIG. 5 may be as shown in the following table.

TABLE 5

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | X | X | X |
| abs_level_qt1_flag | | | | | 0 | 0 | | 1 | | 1 | 1 | 1 | 1 | X | X | X |
| par_level_flag | | | | | | | | 0 | | 1 | 0 | 1 | 0 | X | X | X |
| abs_level_gt3_flag | | | | | | | | 0 | | 0 | 0 | 0 | 1 | X | X | X |
| abs_remainder | | | | | | | | | | | | | 0 | X | X | X |
| dec_abs_level | | | | | | | | | | | | | | 6 | 7 | 10 |
| coeff_sign_flag | | | | | 0 | 1 | | 0 | | 0 | 1 | 1 | 0 | 0 | 1 | 0 |

According to an embodiment disclosed in Table 4, the sig_coeff_flag, the abs_level_gt1_flag, the par_level_flag and/or the abs_level_gt3_flag for transform coefficients in a subblock of a transform block may be encoded. Here, in a case in which the subblock is a subblock having a size of 4×4, a maximum of K bins may be allocated as bins for the sig_coeff_flag, the abs_level_gt1_flag, the par_level_flag, and the abs_level_gt3_flag. In a case in which subblock is a subblock having a size of 2×2, a maximum of L bins may be allocated as bins for the sig_coeff_flag, the abs_level_gt1_flag, the par_level_flag, and the abs_level_gt3_flag. Also, the bins may be context-coded bin. Here, for example, K may be one of 0 to 64, and L may be one of 0 to 16.

In other words, the present embodiment proposes a method of limiting a method of limiting the sum of sig_coeff_flag, abs_level_gt1_flag, par_level_flag, and abs_level_gt3_flag encoded as context encoding beams to improve throughput performance when encoding is performed in the order of the sig_coeff_flag, the abs_level_gt1_flag, the par_level_flag, the abs_level_gt3_flag, the abs_remainder, the dec_abs_level, and the coeff_sign_flag. Here, for example, when the sum of the number of bins for the sig_coeff_flag, the abs_level_gt1_flag, the par_level_flag, and the abs_level_gt3_flag is limited to K, K may be one of values 0 to 64 in a case in which the size of the subblocks for the syntax elements is 4×4, and the K may be one of values 0 to 16 in a case in which the size of the subblocks for the syntax elements is 2×2.

Meanwhile, in the embodiment disclosed in Table 4, different from the existing residual information encoding scheme, it may not be determined whether the number of context bins for abs_level_gt3_flag exceeds the maximum number separately from the number of context-coded bins for other syntax elements. Through this, encoding complexity and structural complexity of the process of encoding the residual information may be reduced.

FIG. 5 is a diagram illustrating an example of transform coefficients in a 4×4 block.

In Table 5, scan_pos indicates a position of a coefficient according to the inverse diagonal scan. Scan_pos 15 may be a transform coefficient of a lower right corner scanned first in the 4×4 block, and scan_pos 0 may be a transform coefficient of a last scanned, that is, an upper left corner. Meanwhile, in an embodiment, the scan_pos may be referred to as a scan position. For example, the scan_pos 0 may be referred to as a scan position 0.

Meanwhile, the present disclosure proposes an embodiment of controlling the number of context-coded bins (i.e., K) for syntax elements coded based on context in the residual information using position information of a non-zero transform coefficient in a transform block. An embodiment of controlling using position information is proposed. As described above, the context-encoded syntax elements may include the sig_coeff_flag, the abs_level_gt1_flag, the par_level_flag, and the abs_level_gt3_flag. Also, hereinafter, a context-coded bin may indicate a context-coded bin for at least one of sig_coeff_flag, abs_level_gt1_flag, par_level_flag, and/or abs_level_gt3_flag.

Figure 6:
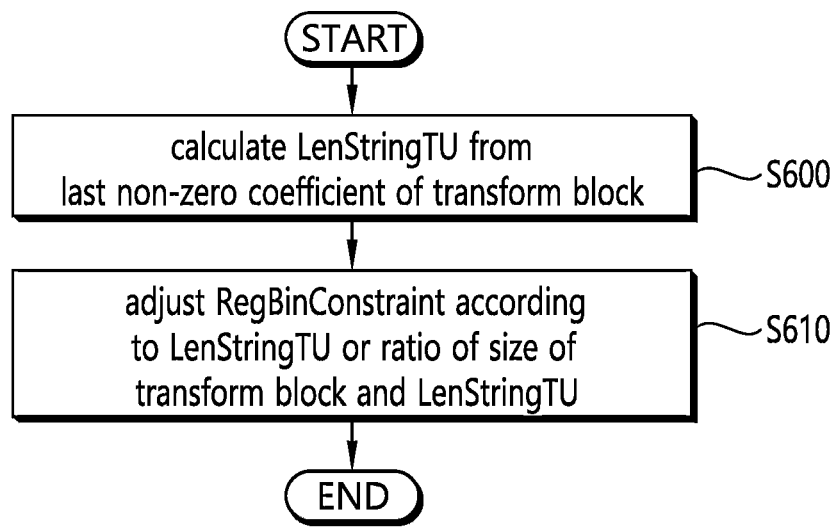
FIG. 6 exemplarily shows a method of deriving the number of context-coded bins for syntax elements of residual information according to the embodiment described above FIG. 7 exemplarily shows an embodiment in which the number of context-coded bins for context-based coded syntax elements is controlled based on two threshold values.

FIG. 6 exemplarily shows a method of deriving the number of context-coded bins for syntax elements of residual information according to an embodiment described above. LenStringTU disclosed in FIG. 6 may refer to a length from a position of a start transform coefficient to a position of the last non-zero transform coefficient in the scanning order in the transform block. In addition, RegBinConstraint disclosed in FIG. 6 may refer to a threshold value for limiting the number of context-coded bins for the syntax elements of sig_coeff_flag, abs_level_gt1_flag, par_level_flag, and abs_level_gt3_flag for a 4×4 size or 2×2 size subblock included in the transform block. That is, the RegBinConstraint may refer to a threshold value that controls the maximum number of context-coded bins that may be used in subblocks in the transform block.

Referring to FIG. 6, the encoding apparatus/decoding apparatus may calculate LenStringTU based on the position of the last non-zero transform coefficient in the transform block (S600). That is, the length from the position of the start transform coefficient to the position of the last non-zero transform coefficient in the scanning order in the transform block may be derived.

Thereafter, the encoding apparatus/decoding apparatus may derive the RegBinConstraint based on the LenStringTU or the ratio between the size of the transform block and the LenStringTU (S610).

Through this embodiment, although the maximum number of context-coded bins is limited to a threshold value, it may be adjusted so that a relatively large number of context encodings may be performed in a transform block having a large number of non-zero transform coefficients.

Alternatively, the present disclosure proposes an embodiment of controlling the limit of the number of context-coded bins for some of the sig_coeff_flag, the abs_level_gt1_flag, the par_level_flag and/or the abs_level_gt3_flag, respectively.

Figure 7:
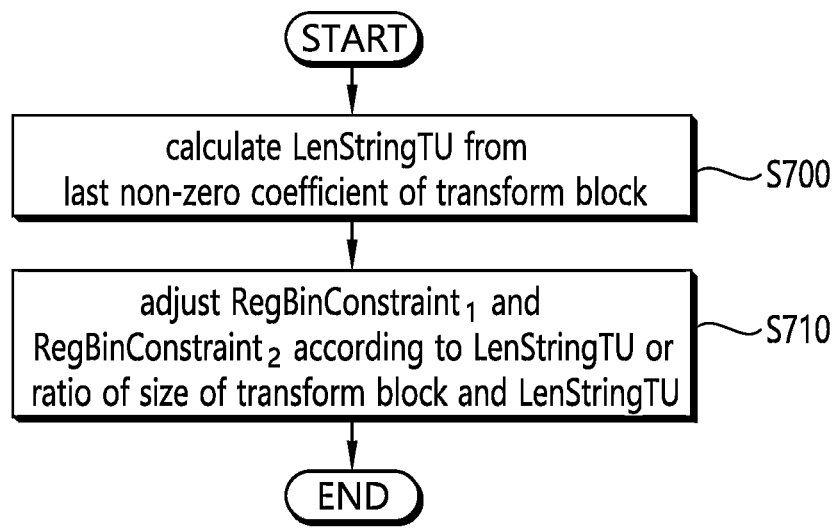

FIG. 7 exemplarily shows an embodiment in which the number of context-coded bins for context-based coded syntax elements is controlled based on two threshold values. LenStringTU disclosed in FIG. 7 may refer to a length from the position of the start transform coefficient to the position of the last non-zero transform coefficient in the scanning order in the transform block. In addition, RegBinConstraint1 disclosed in FIG. 7 may refer to a threshold value for limiting the number of context-coded bins for at least one of syntax elements sig_coeff_flag, abs_level_gt1_flag, par_level_flag, and abs_level_gt3_flag for a 4×4 size or 2×2 size subblock included in the transform block, and RegBinConstraint2 may refer to a threshold value for limiting the number of context-coded bins for the rest of the syntax elements except for the syntax element for RegBinConstraint1. Here, the syntax element for RegBinConstraint1 may be represented as group 1, and the syntax element other than the group 1 among the syntax elements may be represented as group 2. Accordingly, the RegBinConstraint1 may refer to a threshold value controlling the maximum number of context-coded bins that may be used by the syntax element included in group 1 for a subblock in a transform block, and the RegBinConstraint2 may refer to a threshold value controlling the maximum number of context-coded bins that may be used by the syntax element included in group 2 for a subblock in a transform block.

For example, the RegBinConstraint1 may refer to a maximum number of context-coded bins that may be used for encoding sig_coeff_flag, abs_level_gt1_flag, and par_level_flag for a subblock having a 4×4 size or a 2×2 size included in a transform block, and RegBinConstraint2 may refer to a maximum number of context-coded bins that may be used for encoding abs_level_gt3_flag for a subblock having 4×4 size or 2×2 size included in the transform block.

Referring to FIG. 7, the encoding apparatus/decoding apparatus may calculate LenStringTU based on the position of the last non-zero transform coefficient in the transform block (S700). That is, the length from the position of the start transform coefficient to the position of the last non-zero transform coefficient in the scanning order in the transform block may be derived.

Thereafter, the encoding apparatus/decoding apparatus may derive the RegBinConstraint1 and RegBinConstraint2 based on the LenStringTU or the ratio between the size of the transform block and the LenStringTU (S710).

Through the present embodiment, the number of context-coded bins may be effectively reduced using the position information of the last non-zero transform coefficient in the transform block. That is, the number of context-coded bins for encoding the subblock having a 4×4 size or 2×2 size included in the transform block may be variably limited using the characteristics of the transform coefficient in the transform block, and thus, encoding performance may be improved compared to the existing method of limiting the number of context-coded bins to a fixed value for all subblocks in an image.

Figure 8:
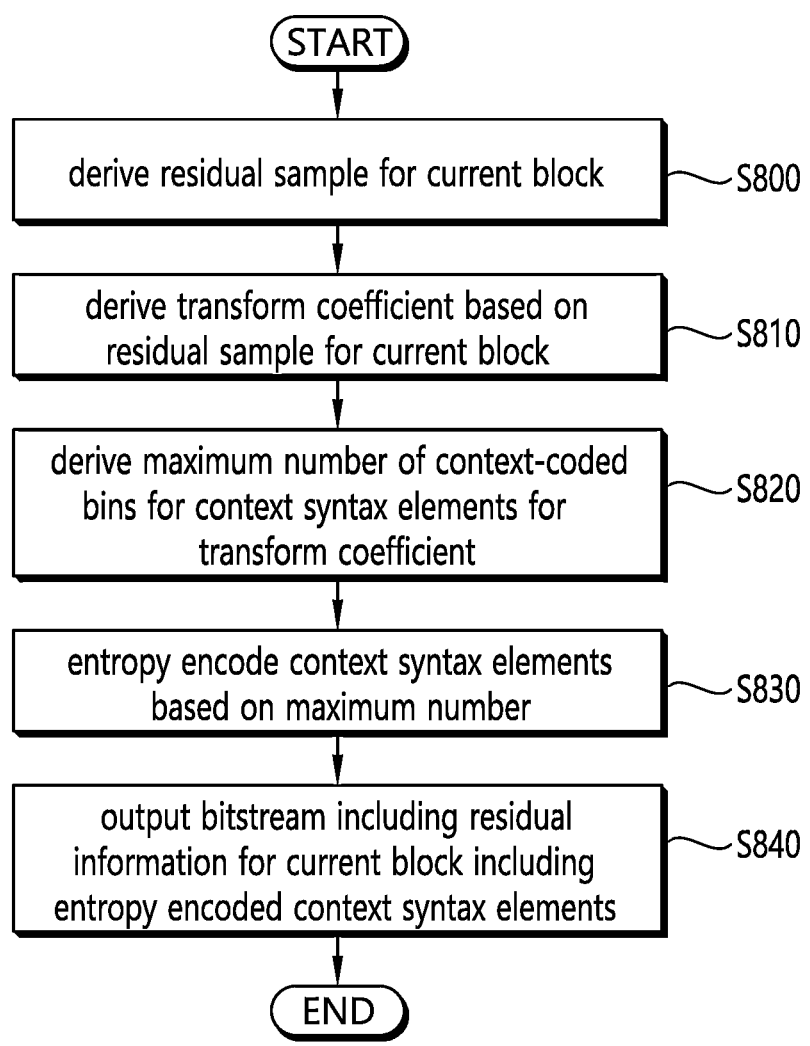
FIG. 8 schematically shows an image encoding method by an encoding apparatus according to the present disclosure.

FIG. 8 schematically shows an image encoding method by an encoding apparatus according to the present disclosure. The method disclosed in FIG. 8 may be performed by the encoding apparatus disclosed in FIG. 2. Specifically, for example, S800 of FIG. 8 may be performed by a subtractor of the encoding apparatus, S810 may be performed by a transformer and a quantizer of the encoding apparatus, and S820 to S840 may be performed by the entropy encoder. In addition, although not shown, the process of deriving a prediction sample may be performed by a predictor of the encoding apparatus, the process of driving reconstructed samples of the current block based on residual samples and prediction samples of the current block may be performed by the adder of the encoding apparatus, and the process of encoding the prediction information for the current block may be performed by the entropy encoder of the encoding apparatus.

The encoding apparatus derives a residual sample for the current block (S800). The encoding apparatus may determine whether to perform inter prediction or intra prediction on the current block and may determine a specific inter prediction mode or a specific intra prediction mode based on an RD cost. The encoding apparatus may derive prediction samples for the current block according to the determined mode, and may derive the residual samples by subtracting the prediction samples from the original samples of the current block.

The encoding apparatus derives a transform coefficient based on the residual sample for the current block (S810). The encoding apparatus may derive a transform coefficient based on the residual sample for the current block.

For example, the encoding apparatus may determine whether to apply transform to the residual sample. When transform is not applied to the residual sample, the encoding apparatus may derive the derived residual sample by the transform coefficient. Also, when transform is applied to the residual sample, the encoding apparatus may derive the transform coefficient by performing transform on the derived residual sample. The transform coefficient may be included in a current sub-block of the current block. The current sub-block may be referred to as a current coefficient croup (CG). Also, the size of the current sub-block of the current block may be a 4×4 size or a 2×2 size. That is, the current sub-block of the current block may include a maximum of 16 non-zero transform coefficients or a maximum of 4 non-zero transform coefficients.

Meanwhile, the encoding apparatus may generate and encode a transform skip flag indicating whether transform of residual coefficients of the current block is applied. A bitstream may include a transform skip flag for the current block. The transform skip flag may indicate whether transform is applied to transform coefficients of the current block. That is, the transform skip flag may indicate whether a transform is applied to the transform coefficients. The syntax element representing the transform skip flag may be the transform_skip_flag described above.

The encoding apparatus derives a maximum number of context-coded bins for context syntax elements for the transform coefficient (S820). Here, the maximum number may be a maximum number of the sum of the number of context-coded bins of significant coefficient flags for transform coefficients related to the current subblock of the current block, the number of context-coded bins of first transform coefficient level flags, the number of context-coded bins of parity level flags, and the number of context-coded bins of second transform coefficient level flags.

As an example, the maximum number may be derived in units of transform blocks.

For example, the maximum number may be derived based on the size of the current block (or a current sub-block within the current block). When the size of the current block (or the current sub-block in the current block) is 4×4, the derived maximum number may be derived as one of 0 to 64, and when the size of the current block (or the current sub-block in the current block) is 2×2, the derived maximum number may be derived as one of 0 to 16.

Also, for example, the maximum number may be derived based on the position of the last non-zero transform coefficient of the current block. A length from the position of the start transform coefficient to the position of the last non-zero transform coefficient in the scanning order of the current block may be derived, and the maximum number may be derived based on the length. For example, the maximum number may be derived as a value obtained by multiplying the length by 1.75. Meanwhile, here, the length may correspond to the number of samples of the current block. That is, the length may be the number of samples of the current block. For example, when a transform coefficient having a value of 0 is not included in a transform coefficient array of the current block, the length may be the number of samples of the current block. In other words, the maximum number may be derived based on the number of samples of the current block. For example, the maximum number may be derived as a value obtained by multiplying the number of samples of the current block by 1.75.

The encoding apparatus entropy encodes the context syntax elements based on the maximum number (S830). The encoding apparatus may encode the context syntax elements based on the context based on the maximum number.

For example, the encoding apparatus may encode the context syntax elements of the transform coefficient for the current sub-block of the current block based on the context. The context syntax elements may include a significant coefficient flag indicating whether the transform coefficient is a non-zero transform coefficient, a parity level flag for parity of a transform coefficient level for the transform coefficient, a first transform coefficient level flag regarding whether the transform coefficient level is greater than a first threshold, and a second transform coefficient level flag regarding whether the transform coefficient level of the quantized transform coefficient is greater than a second threshold. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Specifically, when the sum of the number of context-coded bins of context syntax elements to transform coefficients in an order preceding the transform coefficient in the scanning order among transform coefficients for the current sub-block reaches the maximum number (i.e., equal to or greater than the maximum number), signaling of the context syntax elements for the transform coefficient may be omitted (i.e., context syntax elements for the transform coefficient may not be signaled), and bypass-based coded syntax elements for the transform coefficient may be encoded. A value of the transform coefficient may be derived based on the bypass-based coded syntax element.

For example, when the sum of the number of context-coded bins of context syntax elements for 0th transform coefficient to nth transform coefficient determined by the scanning order among the transform coefficients for the current subblock reaches the maximum number (i.e., equal to or greater than the maximum number), signaling of the significant coefficient flag, a first transform coefficient level flag, a parity level flag, and a second transform coefficient level flag for an (n+1)th transform coefficient determined by the scanning order may be omitted, and the bypass-based coded syntax element for the (n+1)th quantized transform coefficient may be encoded.

That is, for example, when the sum of the number of context-coded bins of the significant coefficient flags, first transform coefficient level flags, parity level flags, and the second transform coefficient level flags for the 0th transform coefficient to the nth transform coefficient determined by the scanning order among the transform coefficients for the current subblocks reaches the maximum number (i.e., equal to or greater than the maximum number), signaling of the significant coefficient flag, the first transform coefficient level flag, the parity level flag, and the second transform coefficient level flag for the n+1 transform coefficient determined by the scanning order may be omitted, and a bypass-based coded syntax element for the (n+1)th quantized transform coefficient may be encoded.

The encoding apparatus outputs a bitstream including residual information for the current block including the entropy encoded context syntax elements (S840). For example, the encoding apparatus may output image information including the residual information as a bitstream.

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, dec_abs_level and/or mts_idx.

Specifically, for example, the residual information may include a transform skip flag for the current block. The transform skip flag may indicate whether transform is applied to transform coefficients of the current block. That is, the transform skip flag may indicate whether a transform is applied to the transform coefficients. The syntax element representing the transform skip flag may be the transform_skip_flag described above.

Also, for example, the residual information may include position information indicating the position of the last non-zero transform coefficient in the transform coefficient array of the current block. That is, the residual information may include position information indicating the position of the last non-zero transform coefficient in the scanning order of the current block. The position information may include information indicating a prefix of a column position of the last non-zero coefficient, information indicating a prefix of a row position of the last non-zero coefficient, Information indicating a suffix of the column position of the last non-zero coefficient, and information indicating a suffix of a row position of the last non-zero coefficient. The syntax elements for the position information may be last_sig_coeff_x_prefix, last_sig_coeff_y_prefix, last_sig_coeff_x_suffix, and last_sig_coeff_y_suffix. Meanwhile, the non-zero transform coefficient may be referred to as a significant coefficient.

Also, for example, the residual information may include context syntax elements coded based on a context for a transform coefficient in a current subblock of the current block. The context syntax elements may include a significant coefficient flag indicating whether the transform coefficient is a non-zero transform coefficient, a parity level flag for parity of a transform coefficient level for the transform coefficient, a first transform coefficient level flag regarding whether the transform coefficient level is greater than the first threshold value, and a second transform coefficient level flag regarding whether the transform coefficient level of the quantized transform coefficient is greater than a second threshold value. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Also, for example, the residual information may include a bypass-based coded syntax element for a transform coefficient in the current sub-block of the current block. The syntax element may be abs_remainder and/or dec_abs_level.

Meanwhile, the bitstream may include prediction information for the current block. The prediction information may include information on an inter prediction mode or an intra prediction mode performed on the current block. The encoding apparatus may generate and encode prediction information for the current block.

Meanwhile, the bitstream may be transmitted to the decoding apparatus through a network or a (digital) storage medium. Here, the network may include a broadcasting network and/or a communication network, and the digital storage medium may include various storage mediums such as USB, SD, CD, DVD, Blu-ray, HDD, and SSD.

Figure 9:
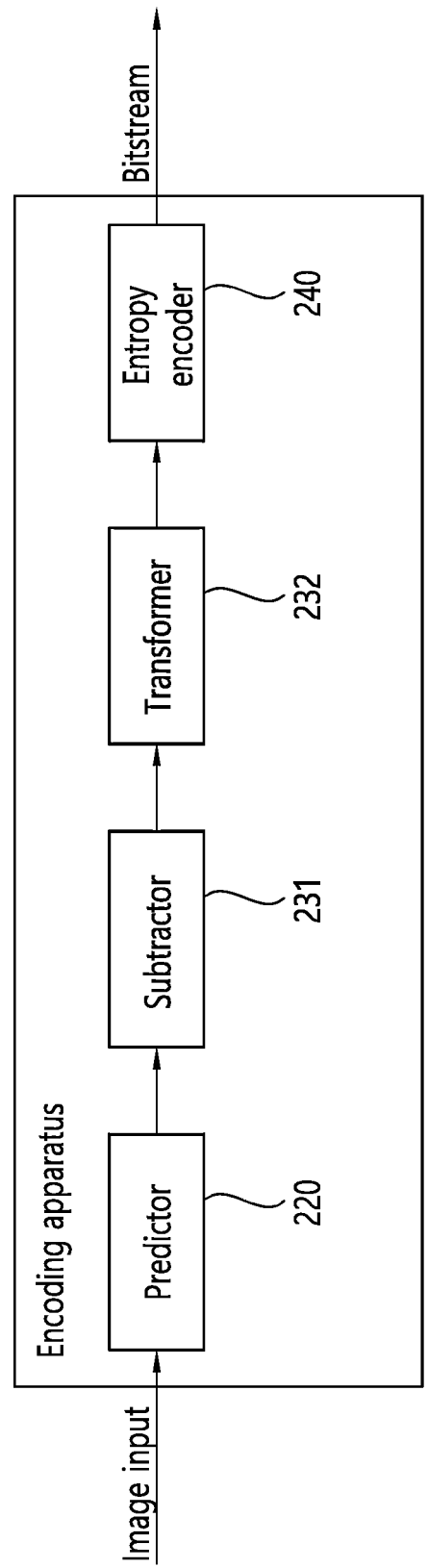
FIG. 9 schematically shows an encoding apparatus for performing an image encoding method according to the present disclosure.

FIG. 9 schematically shows an encoding apparatus for performing an image encoding method according to the present disclosure. The method disclosed in FIG. 8 may be performed by the encoding apparatus disclosed in FIG. 9. Specifically, for example, the subtractor of the encoding apparatus of FIG. 9 may perform S800 of FIG. 8, the transformer and the quantizer of the encoding apparatus of FIG. 9 may perform S810 of FIG. 9. The entropy encoder of the encoding apparatus may perform steps S820 to S840 of FIG. 8. In addition, although not shown, the process of deriving a prediction sample may be performed by a predictor of the encoding apparatus, a process of deriving reconstructed samples of a current block based on residual samples and prediction samples of the current block may be performed by the adder of the encoding apparatus, and a process of encoding the prediction information for the current block may be performed by an entropy encoder of the encoding apparatus.

Figure 10:
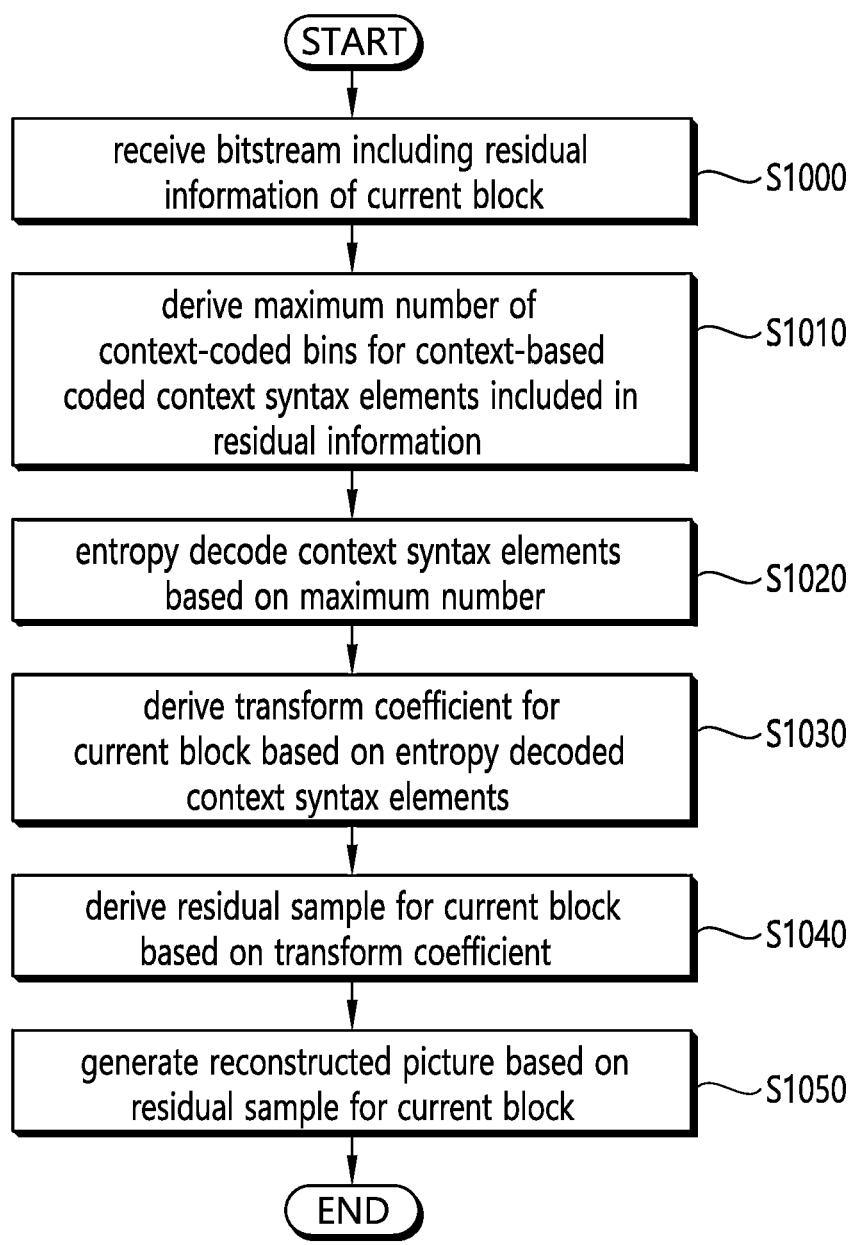
FIG. 10 schematically shows an image decoding method by a decoding apparatus according to the present disclosure.

FIG. 10 schematically shows an image decoding method by a decoding apparatus according to the present disclosure. The method disclosed in FIG. 10 may be performed by the decoding apparatus illustrated in FIG. 3. Specifically, for example, S1000 to S1030 of FIG. 10 may be performed by an entropy decoder of the decoding apparatus, S1040 may be performed by a dequantizer and an inverse transformer of the decoding apparatus, and S1050 may be performed by the adder of the decoding apparatus. Also, although not shown, the process of deriving a prediction sample may be performed by a predictor of the decoding apparatus.

The decoding apparatus receives a bitstream including residual information for the current block (S1000). The decoding apparatus may receive image information including residual information for the current block through a bitstream. Here, the current block may be a coding block (CB) or a transform block (TB).

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, dec_abs_level and/or mts_idx.

Specifically, for example, the residual information may include a transform skip flag for the current block. The transform skip flag may indicate whether transform is applied to transform coefficients of the current block. That is, the transform skip flag may indicate whether a transform is applied to the transform coefficients. The syntax element representing the transform skip flag may be the transform_skip_flag described above.

Also, for example, the residual information may include position information indicating a position of the last non-zero transform coefficient in a transform coefficient array of the current block. That is, the residual information may include position information indicating the position of the last non-zero transform coefficient in the scanning order of the current block. The position information may include information indicating a prefix of a column position of the last non-zero coefficient, information indicating a prefix of a row position of the last non-zero coefficient, information indicating a suffix of the column position of the last non-zero coefficient, and information indicating a suffix of the row position of the last non-zero coefficient. The syntax elements for the position information may be last_sig_coeff_x_prefix, last_sig_coeff_y_prefix, last_sig_coeff_x_suffix, and last_sig_coeff_y_suffix. Meanwhile, the non-zero transform coefficient may be referred to as a significant coefficient.

Also, for example, the residual information may include context-based coded context syntax elements for a transform coefficient in a current sub-block of the current block. The context syntax elements may include a significant coefficient flag indicating whether the transform coefficient is a non-zero transform coefficient, a parity level flag for parity of a transform coefficient level for the transform coefficient, a first transform coefficient level flag regarding whether the transform coefficient level is greater than a first threshold, and a second transform coefficient level flag regarding whether the transform coefficient level of the quantized transform coefficient is greater than a second threshold value. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Also, for example, the residual information may include a bypass-based coded syntax element for a transform coefficient within the current sub-block of the current block. The syntax element may be abs_remainder and/or dec_abs_level.

Meanwhile, the bitstream may include prediction information for the current block. The prediction information may include information on an inter prediction mode or an intra prediction mode performed on the current block. The decoding apparatus may perform inter prediction or intra prediction on the current block based on the prediction information received through the bitstream and may derive prediction samples of the current block.

The decoding apparatus derives a maximum number of context-coded bins for context syntax elements coded based on the context included in the residual information (S1010). Here, the maximum number may be a maximum number of the sum of the number of context-coded bins of significant coefficient flags for transform coefficients related to the current subblock of the current block, the number of context-coded bins of first transform coefficient level flags, the number of context-coded bins of parity level flags, and the number of context-coded bins of second transform coefficient level flags.

As an example, the maximum number may be derived in units of transform blocks.

For example, the maximum number may be derived based on the size of the current block (or a current sub-block within the current block). When the size of the current block (or the current sub-block in the current block) is 4×4, the derived maximum number may be derived as one of 0 to 64, and when the size of the current block (or the current sub-block in the current block) is 2×2, the derived maximum number may be derived as one of 0 to 16.

Also, for example, the maximum number may be derived based on position information indicating the position of the last non-zero transform coefficient of the current block. For example, the position of the last non-zero transform coefficient may be derived based on the position information, a length from the position of the start transform coefficient to the position of the last non-zero transform coefficient in the scanning order of the current block may be derived, and the maximum number may be derived based on the length. For example, the maximum number may be derived as a value obtained by multiplying the length by 1.75. Meanwhile, here, the length may correspond to the number of samples of the current block. That is, the length may be the number of samples of the current block. For example, when a transform coefficient having a value of 0 is not included in a transform coefficient array of the current block, the length may be the number of samples of the current block. In other words, the maximum number may be derived based on the number of samples of the current block. For example, the maximum number may be derived as a value obtained by multiplying the number of samples of the current block by 1.75.

The decoding apparatus entropy decodes the context syntax elements based on the maximum number (S1020). The decoding apparatus may decode the context syntax elements based on the context based on the maximum number.

For example, the decoding apparatus may decode the context syntax elements of the transform coefficient for the current sub-block of the current block based on the context. The context syntax elements may include a significant coefficient flag indicating whether the transform coefficient is a non-zero transform coefficient, a parity level flag for parity of a transform coefficient level for the transform coefficient, a first transform coefficient level flag regarding whether the transform coefficient level is greater than a first threshold, and a second transform coefficient level flag regarding whether the transform coefficient level of the quantized transform coefficient is greater than a second threshold. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Specifically, when the sum of the number of context-coded bins of context syntax elements to transform coefficients in an order preceding the transform coefficient in the scanning order among transform coefficients for the current sub-block reaches the maximum number (i.e., equal to or greater than the maximum number), signaling of the context syntax elements for the transform coefficient may be omitted (i.e., context syntax elements for the transform coefficient may not be signaled), and bypass-based coded syntax elements for the transform coefficient may be decoded, and the value of the transform coefficient may be derived based on the bypass-based coded syntax element.

For example, when the sum of the number of context-coded bins of context syntax elements for 0th transform coefficient to nth transform coefficient determined by the scanning order among the transform coefficients for the current subblock reaches the maximum number (i.e., equal to or greater than the maximum number), signaling of the significant coefficient flag, a first transform coefficient level flag, a parity level flag, and a second transform coefficient level flag for an (n+1)th transform coefficient determined by the scanning order may be omitted, and the bypass-based coded syntax element for the (n+1)th quantized transform coefficient may be decoded, and a value of the (n+1)th quantized transform coefficient may be derived based on the value of the syntax element.

That is, for example, when the sum of the number of context-coded bins of the significant coefficient flags, first transform coefficient level flags, parity level flags, and the second transform coefficient level flags for the 0th transform coefficient to the nth transform coefficient determined by the scanning order among the transform coefficients for the current subblocks reaches the maximum number (i.e., equal to or greater than the maximum number), signaling of the significant coefficient flag, the first transform coefficient level flag, the parity level flag, and the second transform coefficient level flag for the n+1 transform coefficient determined by the scanning order may be omitted, and a bypass-based coded syntax element for the (n+1)th quantized transform coefficient may be decoded, and a value of the transform coefficient quantized n+1 times may be derived based on the value of the syntax element.

The decoding apparatus derives a transform coefficient for the current block based on the entropy decoded context syntax elements (S1030). The decoding apparatus may determine the value of the transform coefficient based on values of the entropy decoded context syntax elements for the transform coefficient. Also, the residual information may include sign information indicating a sign of the transform coefficient. The decoding apparatus may derive the sign of the transform coefficient based on the sign information. A syntax element representing the sign information may be coeff_sign_flag. For example, the decoding apparatus may derive the transform coefficient based on the value and the sign of the transform coefficient.

The decoding apparatus derives a residual sample for the current block based on the transform coefficient (S1040). For example, the decoding apparatus may derive the residual sample for the current block based on the transform coefficient. That is, the decoding apparatus may derive a residual sample of the current sub-block in the current block based on the transform coefficient.

For example, when the value of the transform skip flag for the current block is 1, the decoding apparatus may derive the transform coefficient as the residual sample of the current block. For example, when the value of the transform skip flag for the current block is 1, the decoding apparatus may dequantize the transform coefficient to derive the residual sample of the current block. Alternatively, for example, when the value of the transform skip flag for the current block is 0, the decoding apparatus may inverse-transform the transform coefficient to derive the residual sample of the current block. Or, for example, when the value of the transform skip flag for the current block is 0, the decoding apparatus may dequantize the transform coefficient and inverse-transforms the dequantized coefficient to derive the residual sample of the current block.

The decoding apparatus generates a reconstructed picture based on the residual sample (S1050).

For example, the decoding apparatus may derive a prediction sample by performing an inter prediction mode or an intra prediction mode on the current block based on the prediction information received through the bitstream, and generate the reconstructed picture by adding the prediction sample and the residual samples. For example, the prediction information may include information indicating an intra prediction mode of the current block. Alternatively, the prediction information may include motion related information for the current block.

As described above, an in-loop filtering procedure such as deblocking filtering, SAO and/or ALF procedure may be applied to the reconstructed picture in order to improve subjective/objective picture quality as necessary thereafter.

Figure 11:
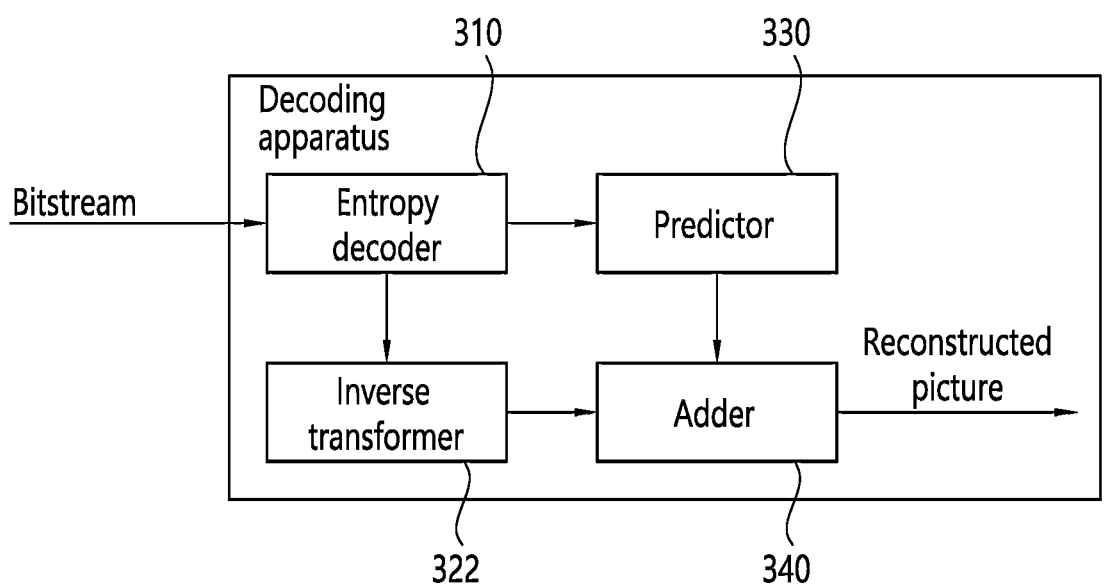
FIG. 11 schematically shows a decoding apparatus for performing an image decoding method according to the present disclosure.

FIG. 11 schematically shows a decoding apparatus for performing an image decoding method according to the present disclosure. The method disclosed in FIG. 10 may be performed by the decoding apparatus illustrated in FIG. 11. Specifically, for example, the entropy decoder of the decoding apparatus of FIG. 11 may perform S1000 to S1030 of FIG. 10, the dequantizer and the inverse transformer of the decoding apparatus of FIG. 11 may perform S1040 of FIG. 10, and the adder of the decoding apparatus of FIG. 11 may perform S1050 of FIG. 10. Also, although not shown, the process of obtaining prediction information of the current block through the bitstream may be performed by the entropy decoder of the decoding apparatus of FIG. 11, and the process of deriving a prediction sample for the current block based on the prediction information may be performed by the predictor of the decoding apparatus of FIG. 11.

According to the present disclosure described above, efficiency of residual coding may be improved.

Also, according to the present disclosure, data coded based on context may be reduced by limiting the sum of the numbers of context coded bins of the significant coefficient flags, the first transform coefficient level flags, the parity level flags, and the second transform coefficient level flags for the transform coefficients in the current block included in residual information.

In addition, according to the present disclosure, the maximum number of context-coded bins of context syntax elements for the transform coefficients in the current block included in the residual information may be derived based on the position of the last non-zero transform coefficient, whereby the number of context-coded bins may be adaptively adjusted in consideration of the number of non-zero transform coefficients of the current block and overall efficiency of the residual coding may be increased.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bitstream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 12:
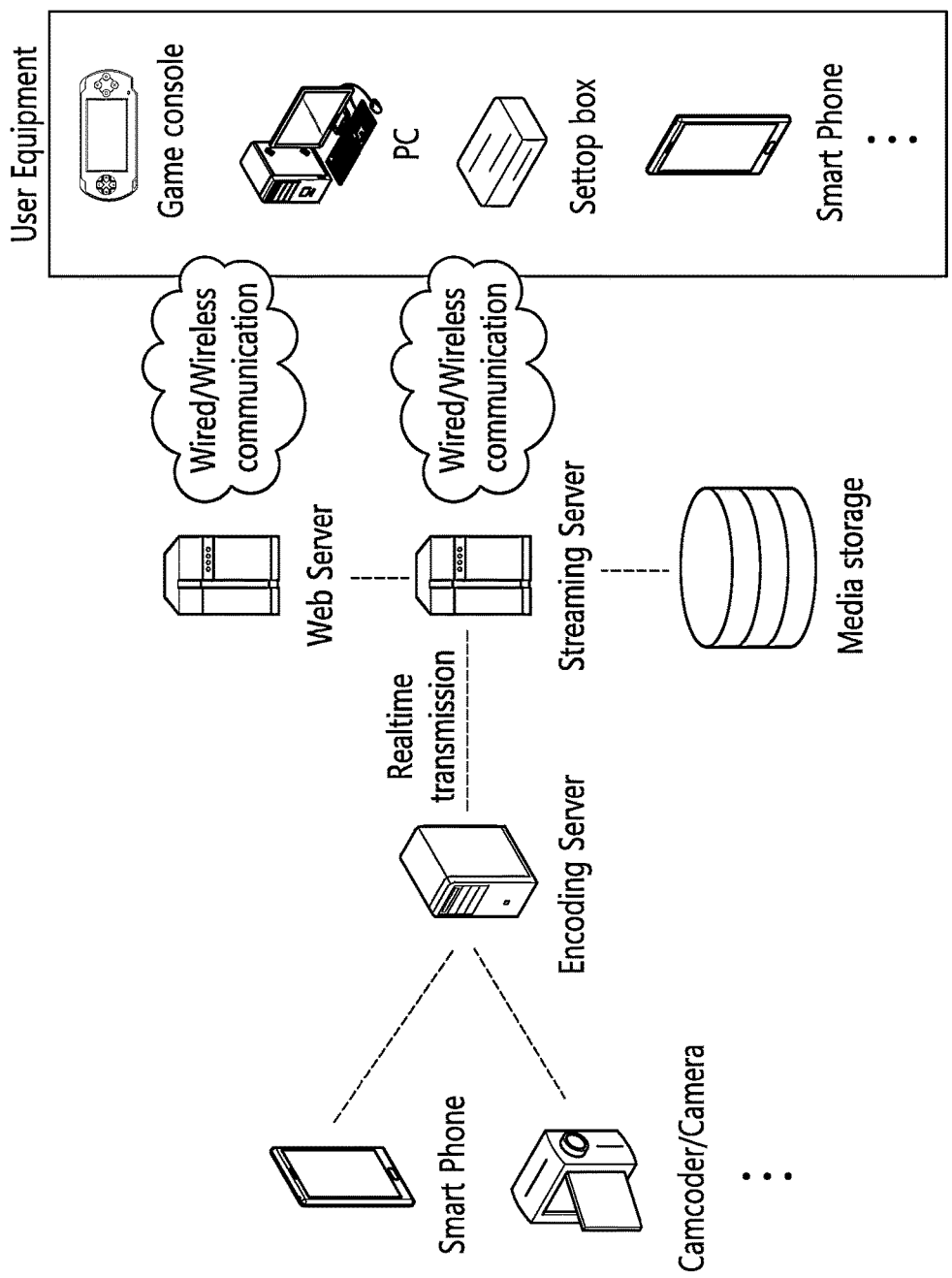
FIG. 12 illustrates a structural diagram of a contents streaming system to which the present disclosure is applied.

FIG. 12 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, comprising:
receiving a bitstream including intra prediction mode information and residual information of a current block;
deriving a maximum number of context-coded bins for context-based coded context syntax elements included in the residual information;
entropy decoding the context syntax elements based on the maximum number;
deriving a transform coefficient for the current block based on the entropy decoded context syntax elements;
deriving a residual sample for the current block based on the transform coefficient; and
generating a prediction sample for the current block based on the intra prediction mode information;
generating a reconstructed picture based on the prediction sample and the residual sample for the current block,
wherein the context syntax elements include:
a significant coefficient flag representing whether the transform coefficient is a non-zero transform coefficient,
a parity level flag for parity of a transform coefficient level for the transform coefficient,
a first transform coefficient level flag regarding whether the transform coefficient level is greater than a first threshold, and
a second transform coefficient level flag regarding whether the transform coefficient level of a quantized transform coefficient is greater than a second threshold, and
wherein the maximum number is a maximum number for a sum of following numbers:
a number of context-coded bins of significant coefficient flags,
a number of context-coded bins of first transform coefficient level flags,
a number of context-coded bins of parity level flags, and
a number of context-coded bins of second transform coefficient level flags.

2. An image encoding method performed by an encoding apparatus, comprising:
generating intra prediction mode information for a current block;
deriving a residual sample for the current block;
deriving a transform coefficient based on the residual sample for the current block;
deriving a maximum number of context-coded bins for context syntax elements for the transform coefficient;
entropy encoding the context syntax elements based on the maximum number; and
outputting a bitstream including the intra prediction mode information and residual information for the current block including the entropy encoded context syntax elements,
wherein the context syntax elements include:
a significant coefficient flag representing whether the transform coefficient is a non-zero transform coefficient,
a parity level flag for parity of a transform coefficient level for the transform coefficient,
a first transform coefficient level flag regarding whether the transform coefficient level is greater than a first threshold, and
a second transform coefficient level flag regarding whether the transform coefficient level of a quantized transform coefficient is greater than a second threshold, and
wherein the maximum number is a maximum number for a sum of following numbers:
a number of context-coded bins of significant coefficient flags,
a number of context-coded bins of first transform coefficient level flags,
a number of context-coded bins of parity level flags, and
a number of context-coded bins of second transform coefficient level flags.

3. A transmission method of data for image, the method comprising:
obtaining a bitstream of image information comprising intra prediction mode information and residual information for a current block including context syntax elements; and
transmitting the data including the bitstream of the image information comprising the intra prediction mode information and the residual information,
wherein the context syntax elements are entropy encoded based on a maximum number of context-coded bins for the context syntax elements,
wherein the context syntax elements include:
a significant coefficient flag representing whether a transform coefficient for the current block is a non-zero transform coefficient,
a parity level flag for parity of a transform coefficient level for the transform coefficient,
a first transform coefficient level flag regarding whether the transform coefficient level is greater than a first threshold, and
a second transform coefficient level flag regarding whether the transform coefficient level of a quantized transform coefficient is greater than a second threshold, and
wherein the maximum number is a maximum number for a sum of following numbers:
a number of context-coded bins of significant coefficient flags, a number of context-coded bins of first transform coefficient level flags,
a number of context-coded bins of parity level flags, and
a number of context-coded bins of second transform coefficient level flags.

* * * * *